US008883893B2

(12) United States Patent
Gabriel et al.

(10) Patent No.: US 8,883,893 B2
(45) Date of Patent: Nov. 11, 2014

(54) FLAME RETARDANT FLASH SPUN SHEETS

(75) Inventors: Sabine Gabriel, Harze (BE); Lakshmi Krishnamurthy, Wilmington, DE (US); Mieczyslaw (Michel) Stachnik, Luxembourg (LU); Mark Gary Weinberg, Wilmington, DE (US)

(73) Assignee: E I du Pont de Nemours and Company, Wilmington, DE (US)

( * ) Notice: Subject to any disclaimer, the term of this patent is extended or adjusted under 35 U.S.C. 154(b) by 0 days.

(21) Appl. No.: 13/448,767

(22) Filed: Apr. 17, 2012

(65) Prior Publication Data

US 2013/0109791 A1  May 2, 2013

Related U.S. Application Data

(60) Provisional application No. 61/476,474, filed on Apr. 18, 2011, provisional application No. 61/476,479, filed on Apr. 18, 2011.

(51) Int. Cl.
| | | |
|---|---|---|
| *C08K 5/49* | (2006.01) | |
| *C08K 5/09* | (2006.01) | |
| *C08K 5/521* | (2006.01) | |
| *D01F 6/04* | (2006.01) | |
| *D01F 6/06* | (2006.01) | |
| *D01F 1/07* | (2006.01) | |

(52) U.S. Cl.
CPC ... *C08K 5/49* (2013.01); *D01F 1/07* (2013.01); *D01F 6/04* (2013.01); *D01F 6/06* (2013.01)
USPC ............ 524/115; 524/121; 524/126; 524/127

(58) Field of Classification Search
CPC ............ C08K 5/09; C08K 5/49; C08K 5/521; D01F 6/04; D01F 6/06; D01F 1/07
USPC ................. 524/127, 115, 121, 126
See application file for complete search history.

(56) References Cited

U.S. PATENT DOCUMENTS

| 5,147,586 A | 9/1992 | Shin et al. |
|---|---|---|
| 5,618,881 A * | 4/1997 | Hojabr ............................ 525/64 |
| 5,977,237 A | 11/1999 | Shin et al. |
| 6,096,421 A * | 8/2000 | Waggoner et al. ............ 428/364 |
| 2002/0015847 A1 | 2/2002 | Shimizu et al. |
| 2004/0225041 A1 | 11/2004 | Katoka et al. |
| 2006/0135020 A1 * | 6/2006 | Weinberg et al. ............. 442/340 |

FOREIGN PATENT DOCUMENTS

| JP | 2007056150 A | * | 3/2007 |
|---|---|---|---|
| WO | WO99/54530 | | 10/1999 |
| WO | WO01/61082 | | 8/2001 |
| WO | WO2006/066025 | | 6/2006 |
| WO | WO 2010104689 A1 | * | 9/2010 |

OTHER PUBLICATIONS

JP 2007056150 A (2007), machine translation, JPO Advanced Industrial Property Network (AIPN).*
JP 2007-056150 A (2007), machine translation, JPO Advanced Industrial Property Network (AIPN).*
PCT International Search Report and Written opinion for International Application No. PCT/US2012/053784 Dated Feb. 13, 2013.

* cited by examiner

*Primary Examiner* — Susannah Chung
*Assistant Examiner* — Josephine Chang

(57) ABSTRACT

The present invention relates to a flame retardant plexifilamentary film-fibril strand comprising at least one polyolefin and at least one flame retardant selected from the group consisting of: phosphate esters, phosphonate esters, phosphinate esters, polyphosphazines, nitrogen-containing polyphosphates, hindered amines and mixtures thereof. The present invention also relates to flame retardant sheet made from the flame retardant plexifilamentary film-fibril strands. The sheet can be made into a flame retardant building substrate, garment, banner, light reflector and cover.

7 Claims, No Drawings

FLAME RETARDANT FLASH SPUN SHEETS

BACKGROUND OF THE INVENTION

1. Field of the Invention

This invention relates to a fire retardant polyolefin plexifilamentary film-fibril strand and sheet made therefrom. This sheet can be used in, for example, a flame retardant building substrate, garment, banner, light reflector and cover.

2. Description of the Related Art

Polyolefins, e.g., polyethylene and polypropylene fibers, are high volume/low cost synthetics that are remarkable for their stain and abrasion resistance. As with all plastics, certain uses have required that the flammability of the polymer be reduced. When decreased flammability has been required, it has generally not been provided by the polyolefin fiber itself, but has instead been provided by one of the other components in the fabricated article.

Polyolefin plexifilamentary film-fibril strands can be made into a sheet which has been used in many end uses, for example, a building substrate, garment, banner, light reflector and cover.

Although flame retardant coatings have been used, a flame retardant that can be spun directly into the fiber would offer advantages in durability and potentially cost.

A flame retardant plexifilamentary fiber strand was made from a mixture of polyesters, a polyester elastomer and a fire retardant via flash spinning from a spin agent of carbon dioxide and water as disclosed in U.S. Pat. No. 6,096,421. However, the plexifilamentary fiber strand had poor mechanical properties.

It would be desirable to make a sheet made from a flame retardant polyolefin plexifilamentary film-fibril strand that does not suffer from the aforementioned disadvantages.

SUMMARY OF THE INVENTION

The present invention relates to a flame retardant plexifilamentary film-fibril strand comprising at least one polyolefin and at least one flame retardant selected from the group consisting of: phosphate esters, phosphonate esters, phosphinate esters, nitrogen containing polyphosphates, polyphosphazines, hindered amines and mixtures thereof.

The present invention also relates to a flame retardant sheet made from the flame retardant plexifilamentary film-fibril strands. The sheet can be made into a flame retardant building substrate, garment, banner, light reflector and cover.

DETAILED DESCRIPTION OF THE INVENTION

Definition of Terms

The term "polymer" as used herein, generally includes but is not limited to, homopolymers, copolymers (such as for example, block, graft, random and alternating copolymers), terpolymers, etc., and blends and modifications thereof. Furthermore, unless otherwise specifically limited, the term "polymer" shall include all possible geometrical configurations of the material. These configurations include, but are not limited to isotactic, syndiotactic, and random symmetries.

The term "polyolefin" as used herein, is intended to mean any of a series of largely saturated polymeric hydrocarbons composed only of carbon and hydrogen. Typical polyolefins include, but are not limited to, polyethylene, polypropylene, polymethylpentene, and various combinations of the monomers ethylene, propylene, and methylpentene.

The term "polyethylene" as used herein is intended to encompass not only homopolymers of ethylene, but also copolymers wherein at least 85% of the recurring units are ethylene units such as copolymers of ethylene and alpha-olefins. Preferred polyethylenes include low-density polyethylene, linear low-density polyethylene, and linear high-density polyethylene. A preferred linear high-density polyethylene has an upper limit melting range of about 130° C. to 140° C., a density in the range of about 0.941 to 0.980 gram per cubic centimeter, and a melt index (as defined by ASTM D-1238-57T Condition E) of between 0.1 and 100, and preferably less than 4.

The term "polypropylene" as used herein is intended to embrace not only homopolymers of propylene but also copolymers where at least 85% of the recurring units are propylene units. Preferred polypropylene polymers include isotactic polypropylene and syndiotactic polypropylene.

The term "plexifilament" as used herein, means a three-dimensional integral network or web of a multitude of thin, ribbon-like, film-fibril elements of random length and with a mean film thickness of less than about 4 microns and a median fibril width of less than about 25 microns. In plexifilamentary structures, the film-fibril elements intermittently unite and separate at irregular intervals in various places throughout the length, width and thickness of the structure to form a continuous three-dimensional network.

Description

The present invention is directed to a flame retardant polyolefin plexifilamentary film-fibril strand and sheet made therefrom. The sheet of the invention is made generally according to the flash-spinning process disclosed in U.S. Pat. No. 5,147,586, which is hereby incorporated by reference with the addition of flame retardant as described herein.

Typical polymers used in the flash-spinning process are polyolefins, such as polyethylene and polypropylene. It is also contemplated that copolymers comprised primarily of ethylene and propylene monomer units, and blends of olefin polymers and copolymers could be flash-spun.

The selection of flame retardant to be added to a flash-spinning process presents a number of difficulties. The flame retardant would need to be thermally stable, completely incorporated into the polymer phase, small particle size (if a solid), high melting point, and odorless.

Suitable flame retardants for making flame retardant plexifilamentary film-fibril strands are: phosphate esters, phosphonate esters, phosphinate esters, nitrogen containing polyphosphates, polyphosphazines, hindered amines and mixtures thereof.

More specifically, suitable flame retardants for making flame retardant plexifilamentary film-fibril strands are:

(a) a liquid resorcinol bis(diphenyl phosphate) of the general formula (1):

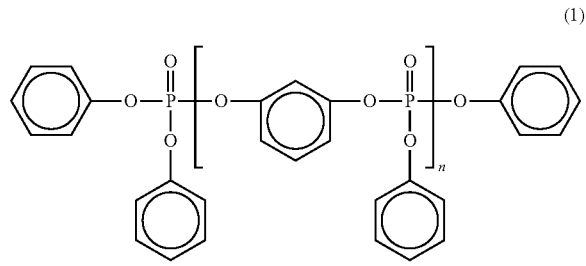

wherein n has an average value of from about 1 to about 7;

(b) a liquid bis-phenol A-bis(diphenyl phosphate) of the general formula (2):

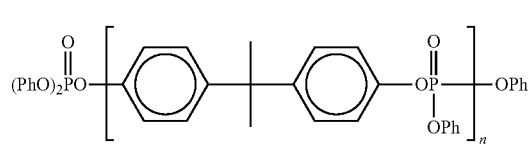
(2)

wherein n has an average value of from about 1 to about 2;

(c) a liquid phosphonate ester of the formula (3):

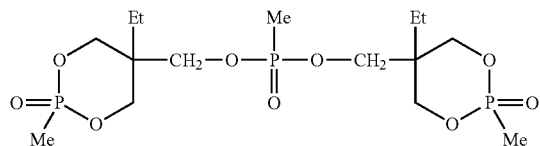
(3)

(d) a solid phosphate ester of the general formula (4):

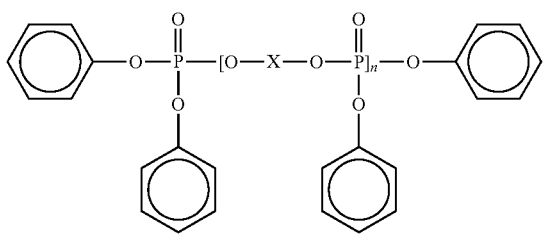
(4)

wherein n has an average value of from about 1.0 to about 2.0 and X is a divalent arylene moiety bonded to both of the oxygen atoms of any one of hydroquinone, resorcinol, 4,4'-biphenol, bisphenol S, or bisphenol F, and wherein the phosphate ester is in the absence of halogen;

(e) a solid aromatic polyphosphate of the formula (5):

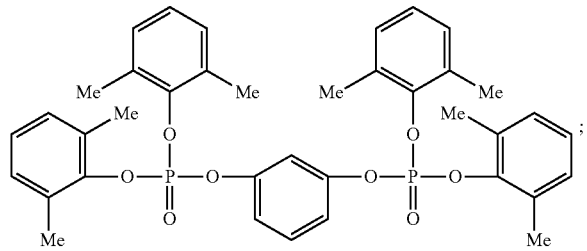
(5)

(f) a solid phosphate ester of the formula (6):

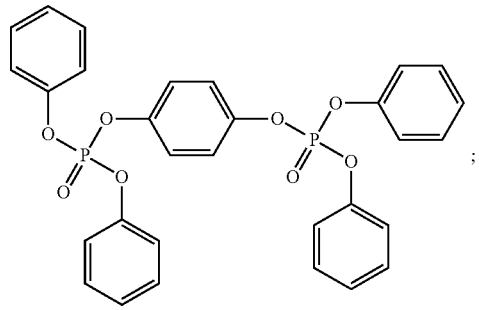
(6)

(g) a solid flame retardant containing about 24 weight percent phosphorus (7);

(h) a nitrogen containing polyphosphate comprising a solid ammonium polyphosphate of the general formula (8):

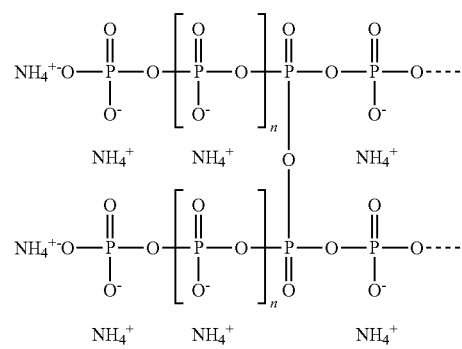
(8)

wherein n >1000; and (i) a polyphosphazene of the general formula (9):

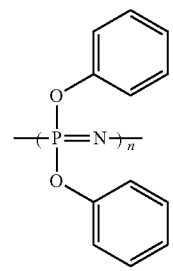
(9)

wherein n >9;

(j) a hindered amine of the formula (10):

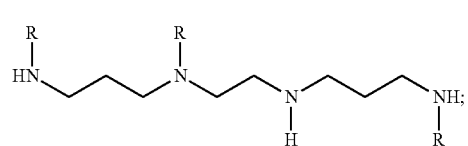
(10)

R = 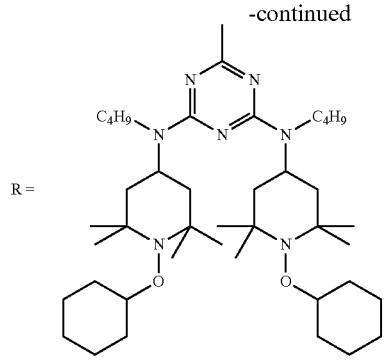

(k) a solid polyphosphonate containing 10.8% phosphorus with a molecular weight of 30,000 to 60,000 (11); and (l) mixtures thereof.

The solid phosphate ester of the general formula (4) is preferably hydroquinone bis(diphenyl phosphate). The arylene X of the solid phosphate ester is preferably the divalent arylene moiety bonded to both of the oxygen atoms of hydroquinone. Preferably the solid phosphate ester has a melting temperature of at least 80° C. This solid phosphate ester is disclosed in the PCT patent application WO 2010/104689.

The flame retardant is present in the plexifilamentary film-fibril strand preferably in an amount of from about 0.5 weight percent to about 15 weight percent based on the total weight of the polyolefin composition, more preferably in an amount of from about 0.5 weight percent to about 10 weight percent based on the total weight of the polyolefin composition, and most preferably in an amount of from about 0.5 weight percent to about 5 weight percent based on the total weight of the polyolefin composition.

Sheets made from the flame retardant plexifilamentary film-fibril strands can be used in, for example, a flame retardant building substrate such as a barrier in walls and ceilings, garment, banner, light reflector and cover such as a protective material for cargo containers, automobiles and barbeque grills.

The flame retardant plexifilamentary film-fibril strands of the invention are made using a flash spinning technology such as described in U.S. Pat. No. 5,147,586. The flame retardant can be added to the process in different ways. It can be added directly into a flash-spinning apparatus or can be blended with a base polymer to make a masterbatch flame retardant/polymer blend. This blend can optionally be added with additional polymer to the flash-spinning unit for spinning. If the flame retardant has difficulty in associating with the base polymer, a compatibilizer can be added. The compatibilizer can be present in the plexifilamentary film-fibril strand in an amount of from about 0.5 weight percent to about 15 weight percent based on the total weight of the polyolefin composition. A suitable compatiblizer is ethylene maleic anhydride. Other additives can be added to the flame retardant plexifilamentary film-fibril strands such as colorants and antioxidants.

TEST METHODS

In the non-limiting examples that follow, the following test methods were employed to determine various reported characteristics and properties.

Limiting Oxygen Index (LOI) was performed according to the general procedure of ASTM D2863 and is designed to determine the minimum percent volume of oxygen needed to sustain flame combustion for a sample in a flowing oxygen and nitrogen environment. Thus, effective flame retardants would require higher oxygen levels than the atmospheric value of 21%, with the most effective additives having much higher LOI values. A Flame Testing Technology Limiting Oxygen Index (FTT LOI) apparatus was used to test a 5×13 cm vertically-supported test sample within a transparent glass chimney. The oxygen and nitrogen flowed upwards through this chimney. Using top surface ignition, the upper portion of the sample was ignited. The resulting burning behavior was observed. Burning of the entire length of sample is considered as a failure for the test. The test was repeated at increasing levels of oxygen percent volume, until the limiting oxygen index was obtained. Results were reported in %.

Vertical Flame Propagation Testing was performed according to the general procedures of ISO EN 11925-2 "Ignitability/Flame Propagation" Test. In this test, a 2 cm long butane flame was applied at 45 degrees for 15 seconds to a 9 cm×25 cm sample held in place by a metal frame. The flame was then removed and the burning observed for another 5 seconds. The burned height after the total 20 seconds was determined. An "average burn height" was calculated for eight samples by a simple arithmetic average of the results. Results for average burn height were reported in cm.

EXAMPLES

Hereinafter the present invention will be described in more detail in the following examples. Flame retardant plexifilamentary film-fibril strands were made using a flash spinning process with a 1 gallon or a 50 cc capacity flash spinning unit.

The 1 gallon capacity flash-spinning apparatus employed herein was a larger version of the 50 cc unit that is described in U.S. Pat. No. 5,147,586. The apparatus consisted of two high-pressure cylindrical chambers, each equipped with a piston that had been adapted to apply pressure to the contents of the chamber through a hydraulic pump. The cylinders each had an internal capacity of 1-gallon. The cylinders were connected to each other at one end by a channel with a static mixer. Mixing was accomplished by forcing the contents of the vessel back and forth between the two cylinders through the static mixer. The pistons were driven by high-pressure oil supplied by a hydraulic system. The output of one of the cylinders was attached to a chamber that had a spinneret assembly at the other end. The spinneret orifice measured 0.762 mm. About 250 g HDPE having an initial melt index of 0.8 dg/min by standard techniques at a temperature of 190° C. with a 2.16 Kg weight and having a melting point of 126-135° C. was charged into one cylinder. The spin agent was a solution of reagent-grade pentane:cyclopentane (75:25) and was added by a high pressure pump to give 17% total polymer in the final solution. The polymer and spin agent were then heated to the mixing temperature of 185° C., as measured by a type J thermocouple and held at that temperature for 1 hour during which the pistons were used to alternately establish a differential pressure of about 2.1 MPa between the two cylinders. This action repeatedly forced the polymer and spin agent through the mixing channel from one cylinder to the other to provide mixing and to effect formation of a spin mixture. After mixing and just prior to spinning, the contents were placed completely in one cylinder by moving the other piston tot the top of its cylinder. The pressure of the spin mixture was then reduced to the desired spinning pressure of 7.9 MPa. The spinneret orifice was then opened and the flash-spun product was redirected by a baffle onto a moving Reemay®-covered belt in a nitrogen-purged stainless steel enclosure to collect the HDPE plexifilamentary film-fibril strands.

The 50 cc capacity flash-spinning apparatus employed herein is described in detail in U.S. Pat. No. 5,147,586. The apparatus consists of two high-pressure cylindrical chambers, each equipped with a piston which is adapted to apply pressure to the contents of the chamber. The cylinders have an inside diameter of 2.54 cm and each has an internal capacity of 50 cc, hence the name. The cylinders are connected to each other at one end through a 0.23 cm diameter channel and a mixing chamber containing a series of fine mesh screens that act as a static mixer. Mixing is accomplished by forcing the contents of the vessel back and forth between the two cylinders through the static mixer. The pistons are driven by high-pressure water supplied by a hydraulic system. A spinneret assembly with a quick-acting means for opening the orifice is attached to the channel through a tee. The spinneret assembly consists of a lead hole of 0.63 cm diameter and about 5.08 cm length and a spinneret orifice with a length and a diameter each measuring 0.762 mm (30 mils).

Handsheets of the flame retardant plexifilamentary film-fibril strands were made with basis weights of 80+/−2 g/m². The Table lists flame retardant data.

Comparative Example A

A 1 gallon capacity flash-spinning unit was used to prepare high density polyethylene (HDPE) (without flame retardant) plexifilamentary film-fibril strands.

Handsheets from the HDPE plexifilamentary filth-fibril strands were made by pulling approximately 2.8 g of the spin material from the Reemay® roll. This product was then fashioned into a 12×30 mm rectangle, laid between two pieces of Kapton®, and rolled flat by a 1-gallon jug to facilitate handling. The assemblage was then pressed between the platens of a hydraulic press at 125° C. for 3 minutes and 22,500 N force to thermally bond the yarn. The inner section was cut out to give pieces that were 9 cm×25 cm and repressed at 125° C. for 2 minutes and 22,500 N force.

Example 1

Example 1 was prepared in a similar manner to Comparative Example A except a masterbatch blend of HDPE and flame retardant (1) Fyrolflex®RDP available from ICL-Industrial Products, Beersheva, Israel was added in with the HDPE prior to spinning.

The masterbatch blend of HDPE and flame retardant (1) was melt compounded with a twin-screw extruder. The throat of a Coperion ZSK-18 mm compounder was fed with HDPE pellets at a rate of 3.9 kg/hr (8.5 lb/hr). The liquid flame retardant (1) was introduced into the extruder with an injection pump (Isco Syringe Pump, Model 1000D, Isco, Lincoln, Nebr.) that had been heated to about 80° C. to facilitate pumping and subsequent mixing. The injection rate was set at 2.8 cc/min to give a flame retardant concentration of 5 wt. %. A high-mixing screw design was used with a temperature profile that varied from 250 to 220° C. and a screw speed of 350-400 RPM. The melt was extruded through a one-hole stand die (4.76 mm diameter) and then cooled in a water trough prior to cutting into pellets.

The masterbatch pellets were introduced into the 1 gallon flash-spinning unit along with the HDPE pellets to make a "salt and pepper"-type blend. Enough HDPE was added to give a final flame retardant concentration of 3 wt. %. Flame retardant plexifilamentary film-fibril strands were collected and handsheets were made therefrom. The mechanical properties of the resulting handsheets appeared to be substantially equivalent to those from both Comparative Example A and commercially-available Tyvek®.

Example 2

Example 2 was prepared in a similar manner to Comparative Example A except flame retardant (1) was poured directly into the 1 gallon flash-spinning unit along with HDPE prior to spinning. Enough flame retardant was added to give a final flame retardant concentration of 15 wt. %. Flame retardant plexifilamentary film-fibril strands were collected and handsheets were made therefrom. The mechanical properties of the resulting handsheets appeared to be substantially equivalent to those from both Comparative Example A and commercially-available Tyvek®.

Example 3

Example 3 was prepared in a similar manner to Example 1 except that flame retardant (2) Fyrolflex® BDP available from ICL-Industrial Products, Beersheva, Israel was substituted for flame retardant (1).

The masterbatch pellets were made the same as in Example 1 and introduced into the 1 gallon flash-spinning unit along with the HDPE pellets to make a "salt and pepper"-type blend. Enough HDPE was added to give a final flame retardant concentration of 5 wt. %. Flame retardant plexifilamentary film-fibril strands were collected and handsheets were made therefrom. The mechanical properties of the resulting handsheets appeared to be substantially equivalent to those from both Comparative Example A and commercially-available Tyvek®.

Example 4

Example 4 was prepared in a similar manner to Example 1 except that flame retardant (2) was substituted for flame retardant (1) and a slightly modified masterbatch process was used to produce a higher concentration of flame retardant in the flame retardant plexifilamentary film-fibril strands.

A 10 wt. % BDP masterbatch was produced on a Coperion ZSK-28 mm compounder. The high-density polyethylene was fed into the back end of the extruder at a rate of 8.2 kg/hr (18 lb/hr). The flame retardant (2) was introduced into the extruder with an injection pump (Isco Syringe Pump, Model 1000D, Isco, Lincoln, Nebr.) that had been heated to about 80° C. to facilitate pumping and subsequent mixing. The injection rate was set at 11.4 cc/min. A high-mixing screw design was used with a temperature profile that varied from 250 (feed end) to 220° C. (die end) and a screw speed of 500 RPM. The polymer melt was extruded through a 3.18 mm (⅛") single-hole die, cooled in a water quench bath, and then pelletized. The pellets were used without any additional HDPE for flash-spinning. Flame retardant plexifilamentary film-fibril strands were collected and handsheets were made therefrom. The mechanical properties of the resulting handsheets appeared to be substantially equivalent to those from both Comparative Example A and commercially-available Tyvek®.

Example 5

Example 5 was prepared in a similar manner to Example 1 except that flame retardant (3) Amgard® 1045 available from Rhodia, Cranbury, N.J. was substituted for flame retardant (1)

and no additional HDPE was needed for flash-spinning. Flame retardant plexifilamentary film-fibril strands were collected and handsheets were made therefrom. The mechanical properties of the resulting handsheets appeared to be substantially equivalent to those from both Comparative Example A and commercially-available Tyvek®.

Example 6

Example 6 was prepared in a similar manner to Example 5 except that a masterbatch was prepared with a higher concentration of flame retardant (3), as well as no additional HDPE was needed for flash-spinning.

HDPE was fed into the masterbatch extruder at a rate of 8.2 kg/hr (18 lb/hr). Flame retardant (3) was introduced into the extruder with an injection pump (Isco Syringe Pump, Model 1000D, Isco, Lincoln, Nebr.) that had been heated to about 80° C. to facilitate pumping and subsequent mixing. The injection rate was set at 11.4 cc/min. A high-mixing screw design was used with a temperature profile that varied from 240 (feed end) to 230° C. (die end) and a screw speed of 300 RPM. The polymer melt was extruded through a 6.35 mm (¼") single-hole die, cooled in a water quench bath, and then pelletized. The pellets had a concentration of 10 wt. % flame retardant (3). Flame retardant plexifilamentary film-fibril strands were collected and handsheets were made therefrom. The mechanical properties of the resulting handsheets appeared to be substantially equivalent to those from both Comparative Example A and commercially-available Tyvek®.

Example 7

Example 7 was prepared in a similar manner to Example 6 except that a masterbatch was prepared with the addition of a compatibilizer.

A pellet blend of HDPE and Fusabond® E100 ethylene maleic anhydride available from DuPont was made to give 10 wt. % Fusabond® and fed into the masterbatch extruder's feed hopper. The blend was fed into the extruder at a rate of 8.2 kg/hr (18 lb/hr). Flame retardant (3) was introduced into the extruder with an injection pump (Isco Syringe Pump, Model 1000D, Isco, Lincoln, Nebr.) that had been heated to about 80° C. to facilitate pumping and subsequent mixing. The injection rate was set at 11.4 cc/min. A high-mixing screw design was used with a temperature profile that varied from 240 (feed end) to 230° C. (die end) and a screw speed of 300 RPM. The polymer melt was extruded through a 6.35 mm (¼") single-hole die, cooled in a water quench bath, and then pelletized. The pellets had a concentration of 10 wt. % flame retardant (3) and 10 wt. % Fusabond® E100. Flame retardant plexifilamentary film-fibril strands were collected and handsheets were made therefrom. The mechanical properties of the resulting handsheets appeared to be substantially equivalent to those from both Comparative Example A and commercially-available Tyvek®.

Example 8

Example 8 was prepared in a similar manner to Example 1 except that flame retardant (5) PX-200 available from Daihachi Chemicals, Japan was substituted for flame retardant (1).

The masterbatch blend of HDPE and flame retardant (5) was melt compounded with a twin-screw extruder. The throat of a Coperion ZSK-30 mm compounder was fed with HDPE pellets at a rate of 8.2 kg/hr (18 lb/hr). The solid flame retardant (5) was introduced into the extruder with a weight-loss feeder set at 0.91 kg/hr (2 lb/hr) to give a flame retardant concentration of 10 wt. %. A high-mixing screw design was used with a temperature profile that varied from 240 to 230° C. and a screw speed of 270 RPM. The melt was extruded through a one-hole stand die (6.35 mm diameter) and then cooled in a water trough prior to cutting into pellets.

The masterbatch was introduced into the 1-gallon flash-spinning unit along with the HDPE pellets to make a "salt and pepper"-type blend. Enough HDPE was added to give a final flame retardant concentration of 5 wt. %. Flame retardant plexifilamentary film-fibril strands were collected. Handsheets were made therefrom by pulling approximately 2.8 g of the spin material from the Reemay® roll and placing them on a Mylar® film with an approximate area of 10×26 mm. Another piece of Mylar® film was placed on top, and the assemblage was compressed into a consolidated layer of fibers. The Mylar® films were then removed, and the consolidated layer of fibers was placed in a manila folder and passed through a GPC HeatSeal® H700 ProLaminator set at 120° C. and a speed of three. The inner sections were cut out to give pieces that were 9 cm×25 cm. The basis weights of the final handsheets were about 80 g/m². The mechanical properties of the resulting handsheets appeared to be substantially equivalent to those from both Comparative Example A and commercially-available Tyvek®.

Example 9

Example 9 was prepared in a similar manner to Comparative Example A except a flame retardant (6) Mileflame® FR-200 available from MPI Chemie, The Netherlands, was added in with the HDPE prior to spinning and a 50 cc capacity flash spinning unit was substituted for the 1-gallon capacity flash spinning unit.

0.25 grams of flame retardant (6) and 4.75 grams of HDPE were charged into one cylinder. The spin agent was a solution of reagent-grade pentane:cyclopentane (75:25) and a total mass of 21.97 g was added using a high-pressure screw-type generator. After mixing at 185° C., the pressure was reduced to 9.4 MPa (1360 psi) and the spin valve was opened, further reducing the spin pressure to 8.7 MPa (1260 psi). About 4.8 grams of fluffy, flame retardant plexifilamentary film-fibril strands were collected. Handsheets were made using the procedures of Example 8. The mechanical properties of the resulting handsheets appeared to be substantially equivalent to those from both Comparative Example A and commercially-available Tyvek®.

Example 10

Example 10 was prepared in a similar manner to Example 1 except that flame retardant (7) Aflammit® PCO 900, available from Thor Chemicals, Speyer, Germany was substituted for flame retardant (1). The flame retardant was provided as a 50 wt. % masterbatch in polyethylene. Enough HDPE was added to give a final flame retardant concentration of 10 wt. %. Flame retardant plexifilamentary film-fibril strands were collected and handsheets were made therefrom using the procedures of Example 8. The mechanical properties of the resulting handsheets appeared to be substantially equivalent to those from both Comparative Example A and commercially-available Tyvek®.

Example 11

Example 11 was prepared in a similar manner to Comparative Example A except a masterbatch blend of HDPE and flame retardant (8) Exolit® AP-423 available from Clariant, Charlotte, N.C. was added in with the HDPE prior to spinning and a 50 cc capacity flash spinning unit was substituted for the 1 gallon capacity flash spinning unit.

A 20 wt. % masterbatch was produced with a Prism 16 mm twin-screw extruder. The extruder barrels were set at 220 C and the screws turned at 200 RPM. A "salt and pepper" blend was made in a bag of 318 g AP-423 and 1271 g ground HDPE powder. This blend was fed by screw conveyor into the feed hopper of the extruder at 1.4 kg/hr (3 lb/hr). The polymer melt was extruded through a 3.18 mm (1/8") single-hole die, cooled in a water quench bath, and then pelletized. Additional HDPE was added to the masterbatch during flash spinning to produce strands with 5 wt. % flame retardant (8).

The 50 cc capacity flash-spinning apparatus as described above was used. Five grams of 5% flame retardant (8) in HDPE masterbatch were charged into one cylinder. The spin agent was a solution of reagent-grade pentane:cyclopentane (75:25) and a total mass of 21.97 g was added using a high-pressure screw-type generator. After mixing at 185° C., the pressure was reduced to 9.4 MPa (1360 psi) and the spin valve was opened, further reducing the spin pressure to 8.7 MPa (1260 psi). About 4.8 grams of fluffy, flame retardant plexifilamentary film-fibril strands were collected.

Handsheets from this yarn were made using a 14×30 mm rectangular stainless steel loom. The outer edge had closely spaced teeth, approximately 0.2×0.6 mm. The inside 10.5× 26.5 cm of the loom was open. An insert was also fabricated the fit tightly inside the open space. The yarn thread was wound back and forth on the loom, starting on the longer side, followed by the shorter side, longer side and finishing up on the shorter side. This gave a total of four wraps. The threads were wrapped to insure that all threads were on one plane of the loom. The target total weight of thread on the loom was ~3 grams. If after 4 wraps the weight was low, additional wraps were added. The frame was then laid on a piece of Kapton® film with the side having all the wraps facing down. Another piece of Kapton® was placed over the bottom of the wrap. The pre-heated stainless steel insert was fit on the bottom of the loom over the Kapton®. This was all placed between two pieces of pre-heated stainless steel and pressed at 125 C at 22.2 kN (2.5 tons) for 3 minutes in a Pasadena Press. The frame was removed from the press and the hand sheet was cut from the inside of the frame yielding a 10.5×26.5 cm product. This sheet was then placed between two pieces of Kapton® and re-pressed at 125 C at 22.2 kN (2.5 tons) for 2 minutes. The finished product was then trimmed to 9×25 mm for testing and weighed to obtain the basis weight of 80+/−2 g/m². The mechanical properties of the resulting handsheets appeared to be substantially equivalent to those from both Comparative Example A and commercially-available Tyvek®.

Example 12

Example 12 was prepared in a similar manner to Example 11 except that less HDPE was added during flash spinning producing strands with 10 wt. flame retardant (8). Flame retardant plexifilamentary film-fibril strands were collected and handsheets were made therefrom. The mechanical properties of the resulting handsheets appeared to be substantially equivalent to those from both Comparative Example A and commercially-available Tyvek®.

Example 13

Example 13 was prepared in a similar manner to Example 11 except that flame retardant polyphosphazene (9) SPB-100 available from Otsuka Chemicals, Japan was substituted for flame retardant (8) and a slightly different masterbatch production procedure was used.

The masterbatch blend of HDPE and flame retardant (9) was melt compounded with a twin-screw extruder. The throat of a Coperion ZSK-30 mm compounder was fed with HDPE pellets at a rate of 8.2 kg/hr (18 lb/hr). The solid flame retardant (9) was introduced into the extruder with a weight-loss feeder set at 0.91 kg/hr (2 lb/hr) to give a flame retardant concentration of 10 wt. %. A high-mixing screw design was used with a temperature profile that varied from 240 to 230° C. and a screw speed of 270 RPM. The melt was extruded through a one-hole stand die (6.35 mm diameter) and then cooled in a water trough prior to cutting into pellets.

The masterbatch was introduced into the 50 cc flash-spinning unit along with the HDPE pellets to make a "salt and pepper"-type blend. Enough HDPE was added to give a final flame retardant concentration of 5 wt. %. Flame retardant plexifilamentary film-fibril strands were collected. Handsheets were made therefrom by pulling approximately 2.8 g of the spin material and placing it on a Mylar® film with an approximate area of 10×26 mm. Another piece of Mylar® film was placed on top, and the assemblage was compressed into a consolidated layer of fibers. The Mylar® films were then removed, and the consolidated layer of fibers was placed in a manila folder and passed through a GPC HeatSeal® H700 ProLaminator set at 120° C. and a speed of three. The inner sections were cut out to give pieces that were 9 cm×25 cm. The basis weights of the final handsheets were about 80 g/m². The mechanical properties of the resulting handsheets appeared to be substantially equivalent to those from both Comparative Example A and commercially-available Tyvek®.

Example 14

Example 14 was prepared in a similar manner to Comparative Example A except a masterbatch blend of HDPE and flame retardant (10) Flamestab® NOR 116 available from BASF at 20 wt. % by weight concentration was added in with the HDPE prior to spinning.

The masterbatch pellets were introduced into the 1-gallon flash-spinning unit along with the HDPE pellets to make a "salt and pepper"-type blend. Enough HDPE was added to give a final flame retardant concentration of 3 wt. %. Flame retardant plexifilamentary film-fibril strands were collected. Handsheets were made therefrom by pulling approximately 2.8 g of the spin material and placing it on a Mylar® film with an approximate area of 10×26 mm. Another piece of Mylar® film was placed on top, and the assemblage was compressed into a consolidated layer of fibers. The Mylar® films were then removed, and the consolidated layer of fibers was placed in a manila folder and passed through a GPC HeatSeal® H700 ProLaminator set at 120° C. and a speed of three. The inner sections were cut out to give pieces that were 9 cm×25 cm. The basis weights of the final handsheets were about 80 g/m². The mechanical properties of the resulting handsheets appeared to be substantially equivalent to those from both Comparative Example A and commercially-available Tyvek®.

Example 15

Example 15 was prepared in a similar manner to Example 14 except that HDPE was added to give a final flame retardant concentration of 5 wt. %. Flame retardant plexifilamentary film-fibril strands were collected and handsheets were made therefrom using the procedures of Example 14. The mechanical properties of the resulting handsheets appeared to be substantially equivalent to those from both Comparative Example A and commercially-available Tyvek®.

Example 16

Example 16 was prepared in a similar manner to Example 1 except a combination of masterbatch blend of HDPE and flame retardant (5) and a masterbatch blend of 20% flame retardant (10) was substituted for flame retardant (1).

The PX-200 masterbatch was made by feeding into the throat of a Coperion ZSK-30 mm compounder HDPE pellets at a rate of 8.2 kg/hr (18 lb/hr). The solid flame retardant (5) was introduced into the extruder with a weight-loss feeder set at 0.91 kg/hr (2 lb/hr) to give a flame retardant concentration of 10 wt. %. A high-mixing screw design was used with a temperature profile that varied from 240 to 230° C. and a screw speed of 270 RPM. The melt was extruded through a one-hole stand die (6.35 mm diameter) and then cooled in a water trough prior to cutting into pellets.

The masterbatch pellets of (5) and (10) were introduced into the 1 gallon flash-spinning unit along with the HDPE pellets to make a "salt and pepper"-type blend. Enough HDPE was added to give a final flame retardant concentration of (5) was 5 wt. % and (10) was 1 wt. %. Flame retardant plexifilamentary film-fibril strands were collected. Handsheets were made therefrom by pulling approximately 2.8 g of the spin material and placing it on a Mylar® film with an approximate area of 10×26 mm. Another piece of Mylar® film was placed on top, and the assemblage was compressed into a consolidated layer of fibers. The Mylar® films were then removed, and the consolidated layer of fibers was placed in a manila folder and passed through a GPC HeatSeal® H700 ProLaminator set at 120° C. and a speed of three. The inner sections were cut out to give pieces that were 9 cm×25 cm. The basis weights of the final handsheets were about 80 g/m². The mechanical properties of the resulting handsheets appeared to be substantially equivalent to those from both Comparative Example A and commercially-available Tyvek®.

Example 17

Example 17 was prepared in a similar manner to Example 1 except a combination of masterbatch blend of HDPE and flame retardant (5) and a masterbatch blend of flame retardant (9) was substituted for flame retardant (1).

Both masterbatches of (5) and (9) were made following the procedures of Example 16. The masterbatch pellets of (5) and (9) were introduced into the 1 gallon flash-spinning unit along with the HDPE pellets to make a "salt and pepper"-type blend. Enough HDPE was added to give a final flame retardant concentration of (5) was 5 wt. % and (9) was 1 wt. %. Flame retardant plexifilamentary film-fibril strands were collected and handsheets were made therefrom following the procedures of Example 16. The mechanical properties of the resulting handsheets appeared to be substantially equivalent to those from both Comparative Example A and commercially-available Tyvek®.

Example 18

Example 18 was prepared in a similar manner to Example 17 except flame retardant (6) was substituted for flame retardant (5) in combination with a 10% masterbatch of (9) in HDPE, produced by the same procedure as in Example 17, except a 50 cc capacity flash spinning unit was substituted for the 1-gallon capacity flash spinning unit.

The 50 cc capacity flash-spinning apparatus employed herein is the same as described in Example 9.

Flame retardant ingredients were introduced into the 50 cc flash-spinning unit along with the HDPE pellets to make a "salt and pepper"-type blend. Enough HDPE was added to give a final flame retardant concentration of (6) was 5 wt. % and (9) was 1 wt. %. Flame retardant plexifilamentary film-fibril strands were collected and handsheets were made therefrom following the procedures of Example 16. The mechanical properties of the resulting handsheets appeared to be substantially equivalent to those from both Comparative Example A and commercially-available Tyvek®.

Example 19

Example 19 was prepared in a similar manner to Example 18 except a combination of masterbatch blend of HDPE and flame retardant (7) and a masterbatch blend of flame retardant (10) was substituted for flame retardants (5) and (9). Flame retardant (7) was obtained as 50 wt. % masterbatch in polyethylene and flame retardant (10) was obtained as a 20 wt. masterbatch in HDPE.

The masterbatch pellets of (7) and (10) were introduced into the 50 cc flash-spinning unit along with the HDPE pellets to make a "salt and pepper"-type blend. Enough HDPE was added to give a final flame retardant concentration of (7) was 2.5 wt. % and (10) was 0.5 wt. %. Flame retardant plexifilamentary film-fibril strands were collected and handsheets were made therefrom following the procedures of Example 16. The mechanical properties of the resulting handsheets appeared to be substantially equivalent to those from both Comparative Example A and commercially-available Tyvek®.

Example 20

Example 20 was prepared in a similar manner to Example 19, except that 0.5 grams of as-received FRX-100 powder (11), FRX Polymers, Chelmsford, Mass., and 4.5 grams of HDPE were introduced into the 50 cc flash-spinning unit to make a "salt and pepper"-type blend. Flame retardant plexifilamentary film-fibril strands were collected and handsheets were made therefrom following the procedures of Example 16. The mechanical properties of the resulting handsheets appeared to be substantially equivalent to those from both Comparative Example A and commercially-available Tyvek®.

TABLE

| Example No. | Flame Retardant | LOI (%) | Average Burn Height (cm) |
|---|---|---|---|
| A | None | 19.4 | 15.1 |
| 1 | 3% (1) | 21.0 | 9.4 |
| 2 | 15% (1) | 23.3 | 7.0 |
| 3 | 5% (2) | 20.7 | 11.8 |
| 4 | 10% (2) | 23.0 | 8.8 |
| 5 | 5% (3) | 22.2 | 10.5 |
| 6 | 10% (3) | 23.9 | 8.1 |
| 7 | 10% (3) 10% Fusabond ® | 24.6 | 8.0 |
| 8 | 5% (5) | 22.1 | 14.4 |
| 9 | 5% (6) | 23.2 | |
| 10 | 10% (7) | 23.9 | 7.3 |
| 11 | 5% (8) | 20.1 | |
| 12 | 10% (8) | 21.5 | |

TABLE-continued

| Example No. | Flame Retardant | | LOI (%) | Average Burn Height (cm) |
|---|---|---|---|---|
| 13 | 5% | (9) | 22.0 | |
| 14 | 3% | (10) | 23.6 | 9.8 |
| 15 | 5% | (10) | 23.1 | 10.6 |
| 16 | 5% | (5) | 22.8 | |
|    | 1% | (10) | | |
| 17 | 5% | (5) | 22.4 | |
|    | 1% | (9) | | |
| 18 | 5% | (6) | 23.3 | |
|    | 1% | (9) | | |
| 19 | 2.5% | (7) | 23.7 | |
|    | 0.5% | (10) | | |
| 20 | 10% | (11) | 21.9 | |

The LOI and average burn height data from the Table show that the addition of a flame retardant to the plexifilamentary film-fibril strands and sheets in Examples 1-20 have improved flame retardancy over the plexifilamentary film-fibril strands and sheets without a flame retardant in Comparative Example A.

What is claimed is:

1. A flame retardant plexifilamentary film-fibril strand consisting of at least one polyolefin, from about 0.5 to about 15 weight percent of ethylene maleic anhydride compatibilizer based upon the total weight of polyolefin composition, and at least one flame retardant selected from the group consisting of:

a) a liquid resorcinol bis(diphenyl phosphate) of the general formula (1):

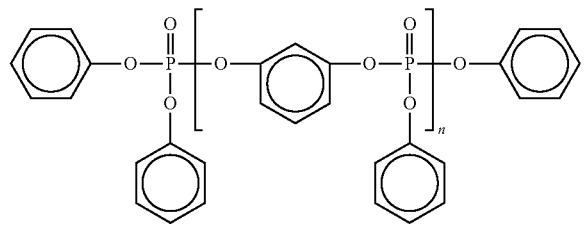

(1)

n = 1-7 wherein n has an average value of from about 1 to about 7;

(b) a liquid bis-phenol A-bis(diphenyl phosphate) of the general formula (2):

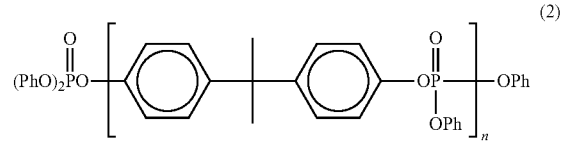

(2)

wherein n has an average value of from about 1 to about 2;

(d) a solid phosphate ester of the general formula (4):

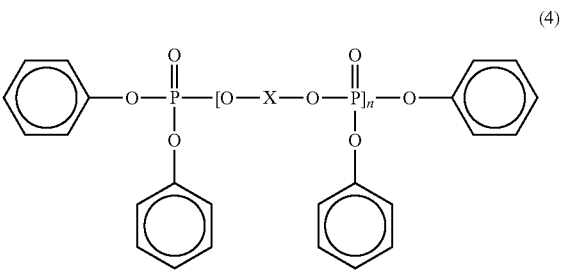

(4)

wherein n has an average value of from about 1.0 to about 2.0 and X is a divalent arylene moiety bonded to both of the oxygen atoms of any one of hydroquinone, resorcinol, 4,4'-biphenol, bisphenol S, or bisphenol F, and wherein the phosphate ester is in the absence of halogen;

(e) a liquid aromatic polyphosphate of the formula (5):

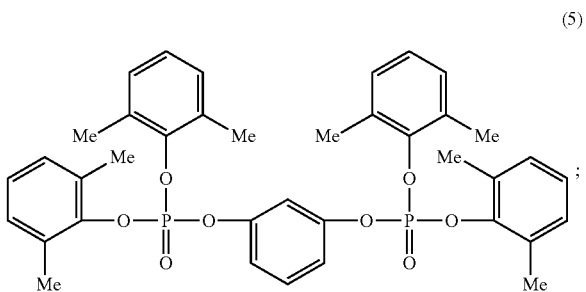 [SMILES: Cc1cccc(C)c1OP(=O)(Oc1cccc(OP(=O)(Oc2c(C)cccc2C)Oc2c(C)cccc2C)c1)Oc1c(C)cccc1C]

(5)

and mixtures thereof.

2. The flame retardant plexifilamentary film-fibril strand of claim 1, wherein the polyolefin is selected from the group consisting of polyethylene, polypropylene and their copolymers.

3. The flame retardant plexifilamentary film-fibril strand of claim 1, wherein the flame retardant is present in an amount of from about 0.5 weight percent to about 15 weight percent based on the total weight of polyolefin composition.

4. The flame retardant plexifilamentary film-fibril strand of claim 1, wherein the solid phosphate ester of the general formula (4) is hydroquinone bis(diphenyl phosphate).

5. The flame retardant plexifilamentary film-fibril strand of claim 4, wherein the solid phosphate ester of the general formula (4) has a melting temperature of at least 80° C.

6. A flame retardant sheet comprising the flame retardant plexifilamentary film-fibril strands of claim 1.

7. A flame retardant article comprising the flame retardant sheet of claim 6 selected from the group consisting of: building substrate, garment, banner, light reflector and cover.

* * * * *